UNITED STATES PATENT OFFICE.

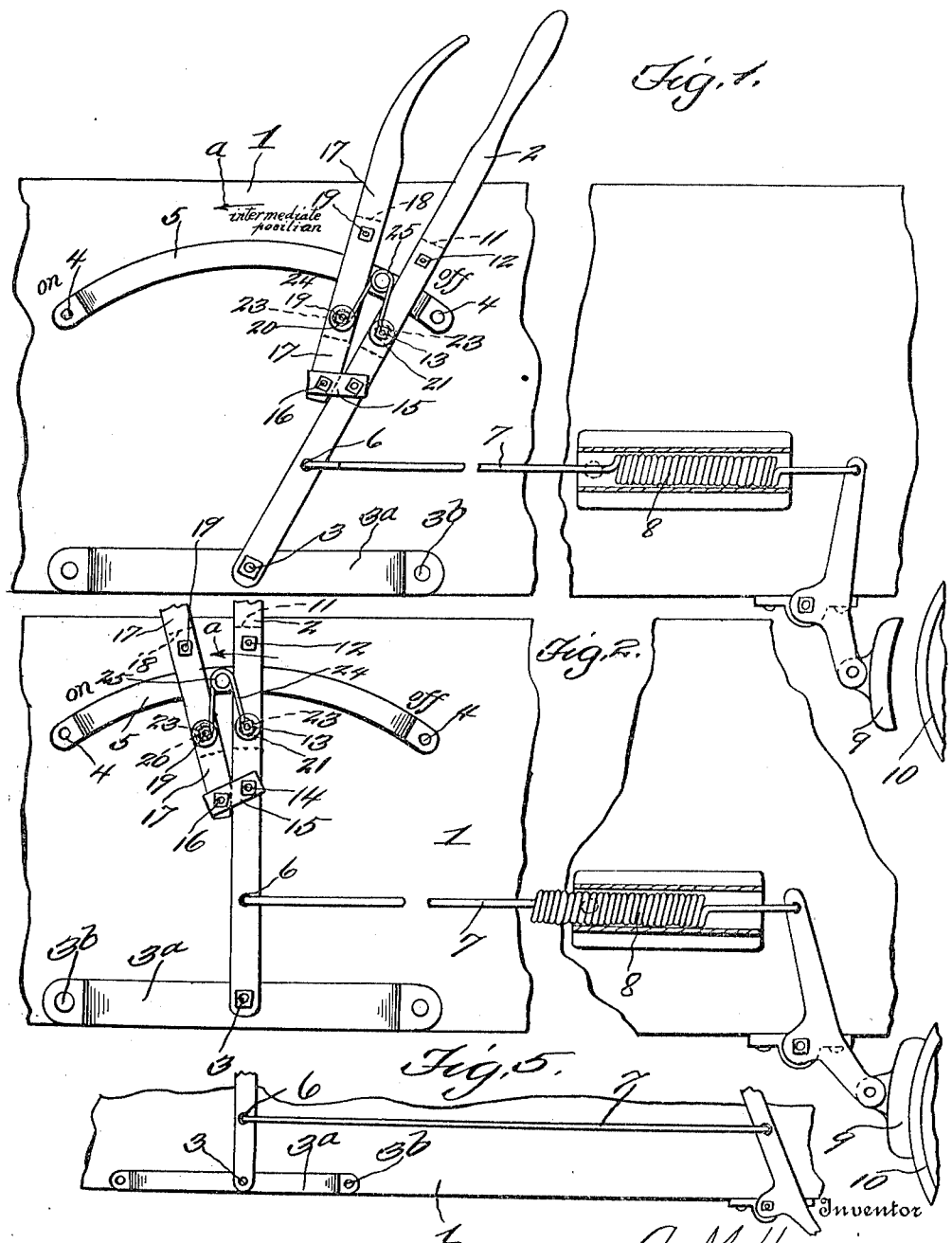

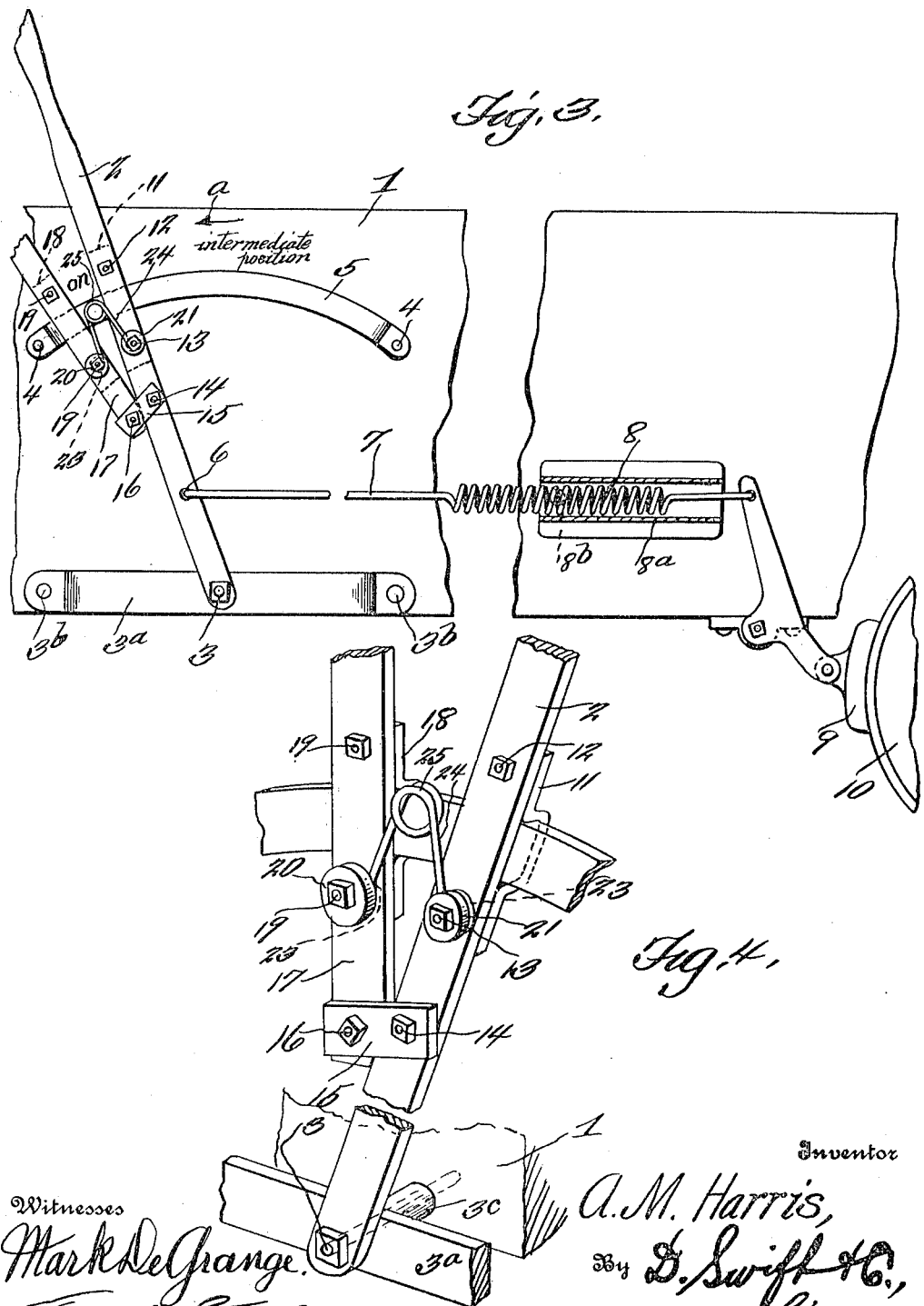

ALBERT M. HARRIS, OF JENKINJONES, WEST VIRGINIA.

VEHICLE BRAKE-LEVER.

1,071,736.　　　　Specification of Letters Patent.　　Patented Sept. 2, 1913.

Application filed April 10, 1913.　Serial No. 760,242.

*To all whom it may concern:*

Be it known that I, ALBERT M. HARRIS, a citizen of the United States, residing at Jenkinjones, in the county of McDowell and State of West Virginia, have invented a new and useful Vehicle Brake-Lever; and I do hereby declare the following to be a full, clear, and exact description of the invention, such as will enable others skilled in the art to which it appertains to make and use the same.

This invention relates to vehicle brakes, and more especially to the brake lever, which is provided with means for holding the same at different points of adjustment relative to the segment bar.

It is an object of this invention to dispense with the usual notches of the segment, in order that a more delicate adjustment may be affected, and in view of the fact that the strain will tend to throw the brake shoes off from the wheel, the holding means will grip the segment more tightly.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a view in elevation showing the brake lever at its off position, and the brake shoe out of contact with the wheel. Fig. 2 is a view in elevation, showing the brake shoe barely applied, and the spring portion of the brake rod, but a mere trifle under tension. Fig. 3 is a view similar to Fig. 2, showing the spring portion of the brake rod considerably under tension. Fig. 4 is an enlarged detail view of a portion of the brake lever and its supplemental brake lever. Fig. 5 is a detail view of a portion of a mine car, showing the spring 8 eliminated or dispensed with from the rod 7.

Referring more especially to the drawings, 1 designates a portion of the side of a mining car, to which the brake lever 2 is pivoted at 3. Also fastened at 4 to the side of the car is a segment bar 5, from which the usual notches are eliminated. Connecting the brake levers at 6 is a brake rod 7, a portion of which is formed into coils 8, which, when the brake lever is in the position shown in Fig. 2, are completely collapsed or closed against one another, so that when the brake lever is moved from its intermediate position to its off position, the brake shoe 9 will move from the wheel 10. When the brake lever is being moved from its intermediate position to its off position, the spring portion of the brake rod acts as a solid rod. However, when the brake lever is moved from its intermediate position in the direction of the arrow $a$, the spring portion of the brake rod is placed under tension, thereby increasing the pressure of the brake shoe on the wheel.

Arching over the segment bar 5 and secured to the brake lever is a metallic strap 11. This metallic strap is secured to the brake lever by the bolts 12 and 13, and is designed to hold the brake lever adjacent the segment bar. Fixed by means of a bolt 14 to the brake lever is a plate 15. This plate 15 is securely clamped to the brake lever by means of the bolt 14 and its nut sufficiently in order to make the same rigid. Pivotally mounted upon the bolt 16 of the plate 15 is a supplemental lever 17, to which a metallic strap 18 is secured by the bolts 19. The plate 18 also arches over the segment bar, in order to hold the supplemental lever against the same. Mounted upon one of the bolts 19 and the bolt 13 are washers 20 and 21, between which and the brake lever and the supplemental lever the eyes 23 of the bowed spring 24 are arranged. This bowed spring is provided with a coil 25, which lends greater yieldability, than if the coil was omitted. The tendency of the bowed spring is to throw the brake lever and the supplemental lever apart, thereby causing portions of the plates 11 and 18 to frictionally bind upon the segment bar, thereby holding the brake lever in delicate adjusted positions. Another advantage in employing this form of bowed spring is the fact that it can be mounted in a more simple and efficient manner than a leaf spring or a coil spring. In moving the brake lever from its intermediate position in the direction of the arrow $a$ in order to increase the pressure of the brake shoe, it is unnecessary to move the supplemental lever in the direction of the brake lever, in order to release the brake lever. In other words, it is only necessary to push or pull upon the brake lever proper, to move it in the direction of the arrow $a$, and when accomplishing such a movement of the brake lever, the supplemental lever automatically releases from frictional contact with the segment bar sufficiently to permit the brake lever to move. However, when it is desired to release the brake shoe, the supplemental lever is moved toward the brake lever, in which case the tension rod will tend to throw the brake lever to its off position.

From the foregoing it will be ascertained that there has been devised a simple and efficient brake lever mechanism, adapted more especially in connection with mine cars, and one which has been found desirable and practical.

The invention having been set forth, what is claimed as new and useful is:—

1. In combination with a tension brake rod, of a brake lever to which the tension brake rod is connected, a segment with respect to which the brake lever is concentrically pivoted, a plate rigidly fixed upon the brake lever, a supplemental lever pivoted to said plate, members carried by the brake lever and the supplemental lever for holding said levers movable adjacent the segment, and a bowed spring interposed between the brake lever and the supplemental lever, tending to throw the levers apart whereby the said members frictionally bind against the segment to hold the brake lever in adjusted positions with regard to the segment against the action of the tension rod.

2. In combination with a tension brake rod, of a brake lever to which the tension brake rod is connected, a segment with respect to which the brake lever is concentrically pivoted, a projection detachably rigidly fixed upon the brake lever, a supplemental lever pivoted to said projection, plates arching over the segment, one carried by the supplemental lever while the other is carried by the brake lever, bolts and nuts for fastening said plates to said levers, a washer on one bolt of each lever, the bolts carrying the washers being diametrically opposite one another, a wire bowed spring having an intermediate coil and provided with eyes at its ends which receive the diametrically opposite bolts between the washers and said levers, said bowed spring tending to throw the levers apart whereby said plates will frictionally bind against the segment to hold the brake lever in adjusted position with regard to the segment against the action of the tension rod.

In testimony whereof I have signed my name to this specification in the presence of two subscribing witnesses.

ALBERT M. HARRIS.

Witnesses:
J. H. COLLINS,
J. P. CURTIS.